Feb. 1, 1944. R. J. THERIAULT 2,340,628
TANK VEHICLE
Filed June 26, 1940 6 Sheets-Sheet 1

INVENTOR:
Raymond J. Theriault
BY John P. Tarbox
ATTORNEY

Feb. 1, 1944. R. J. THERIAULT 2,340,628
TANK VEHICLE
Filed June 26, 1940 6 Sheets-Sheet 2
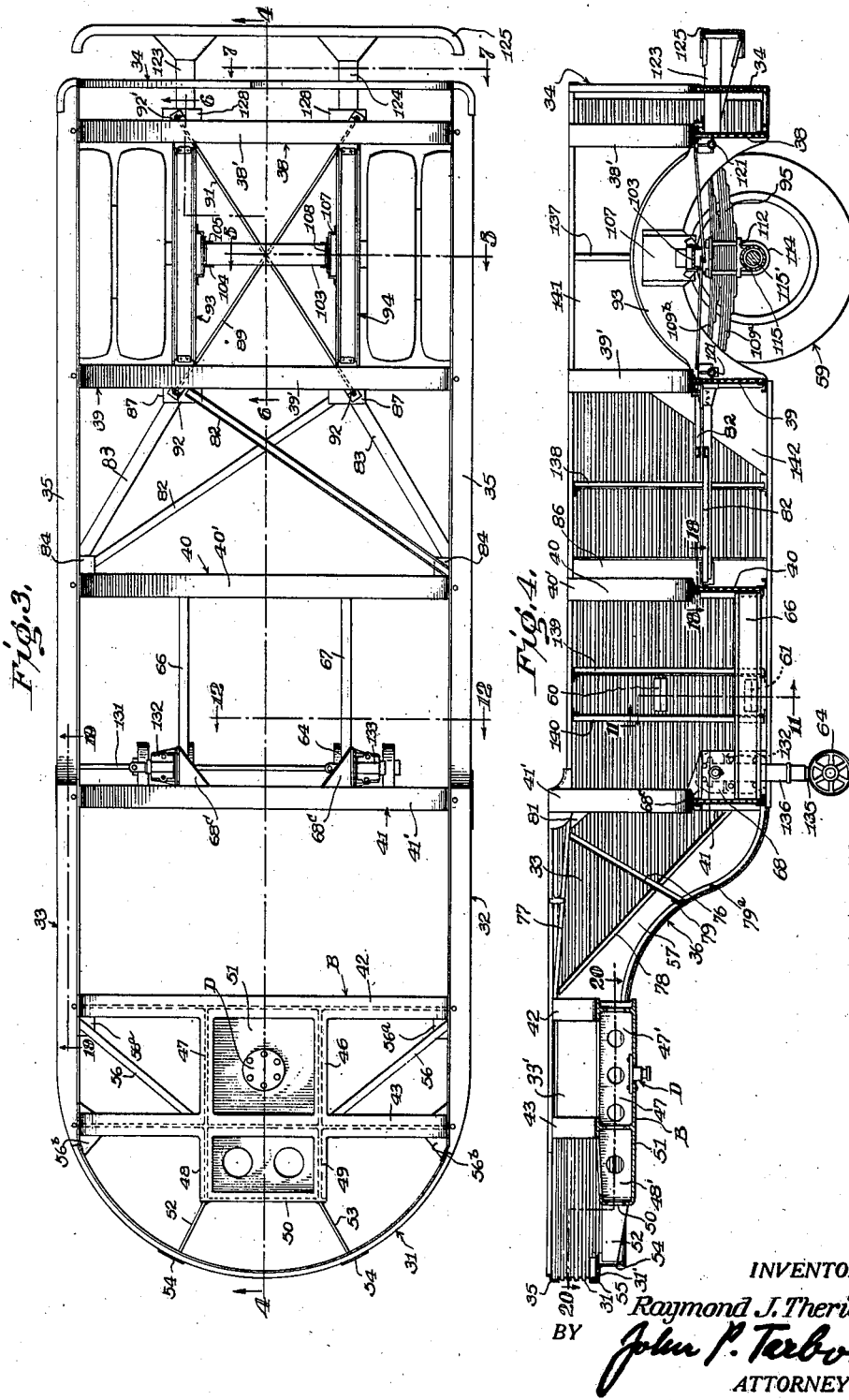
INVENTOR:
Raymond J. Theriault
BY
ATTORNEY

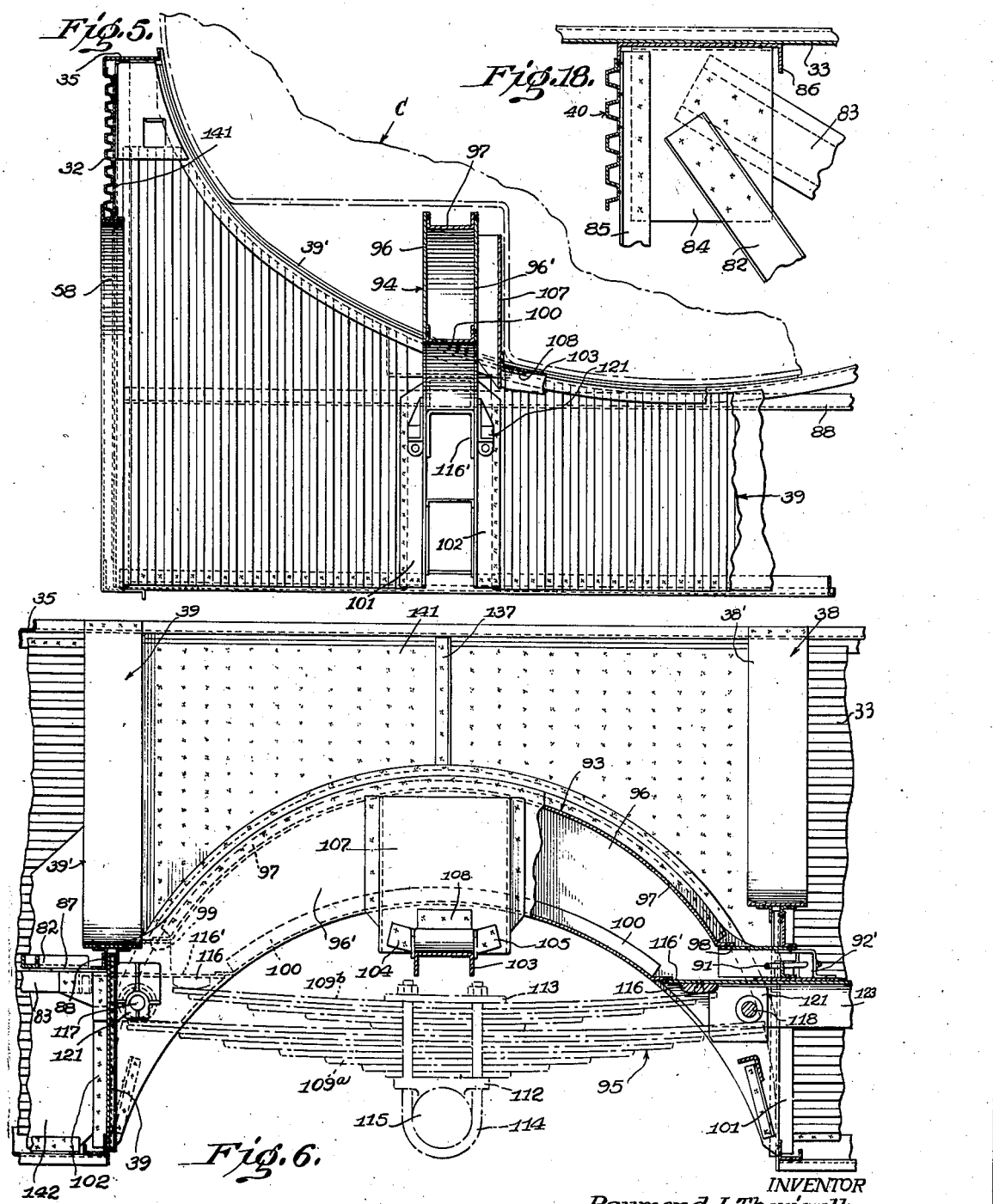

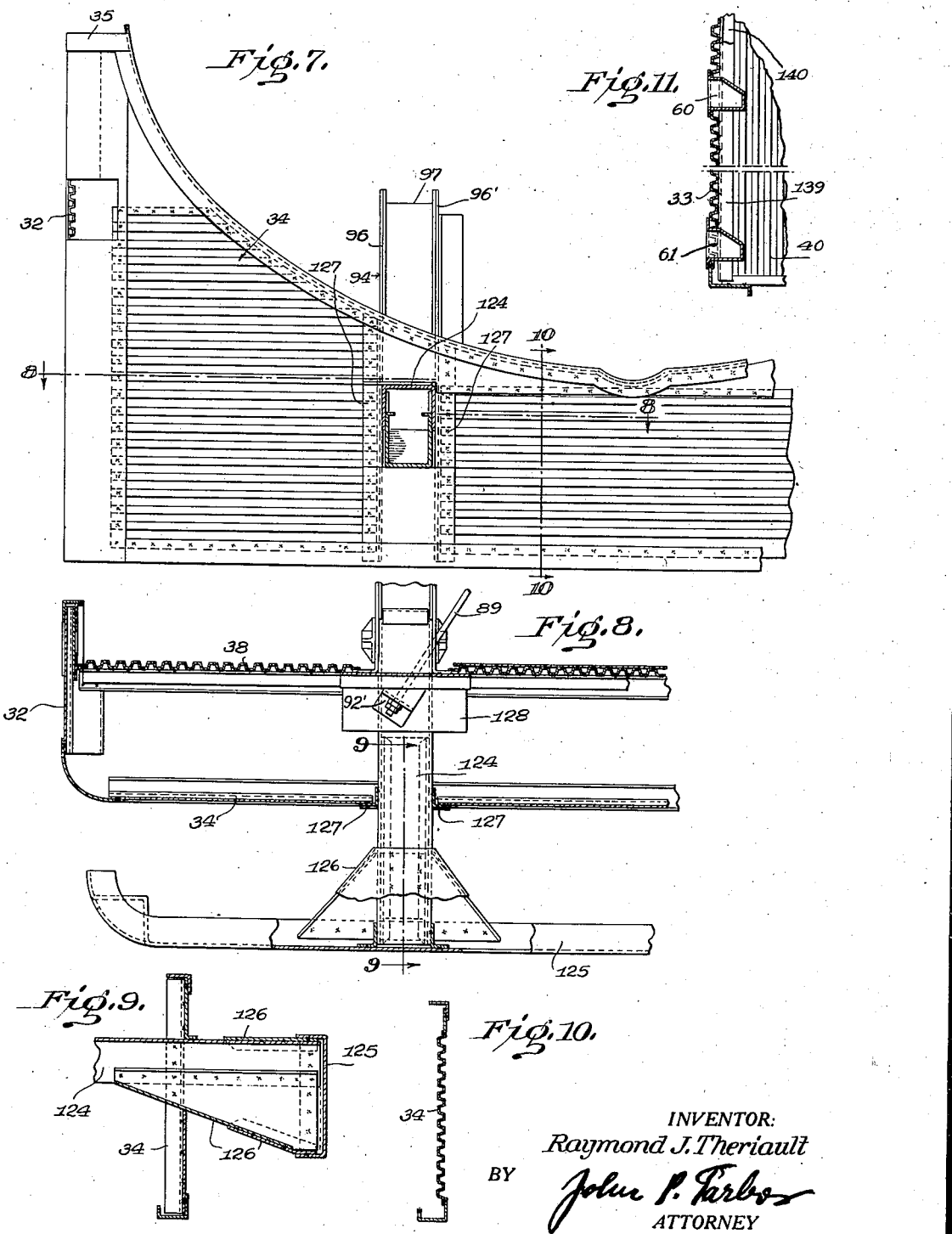

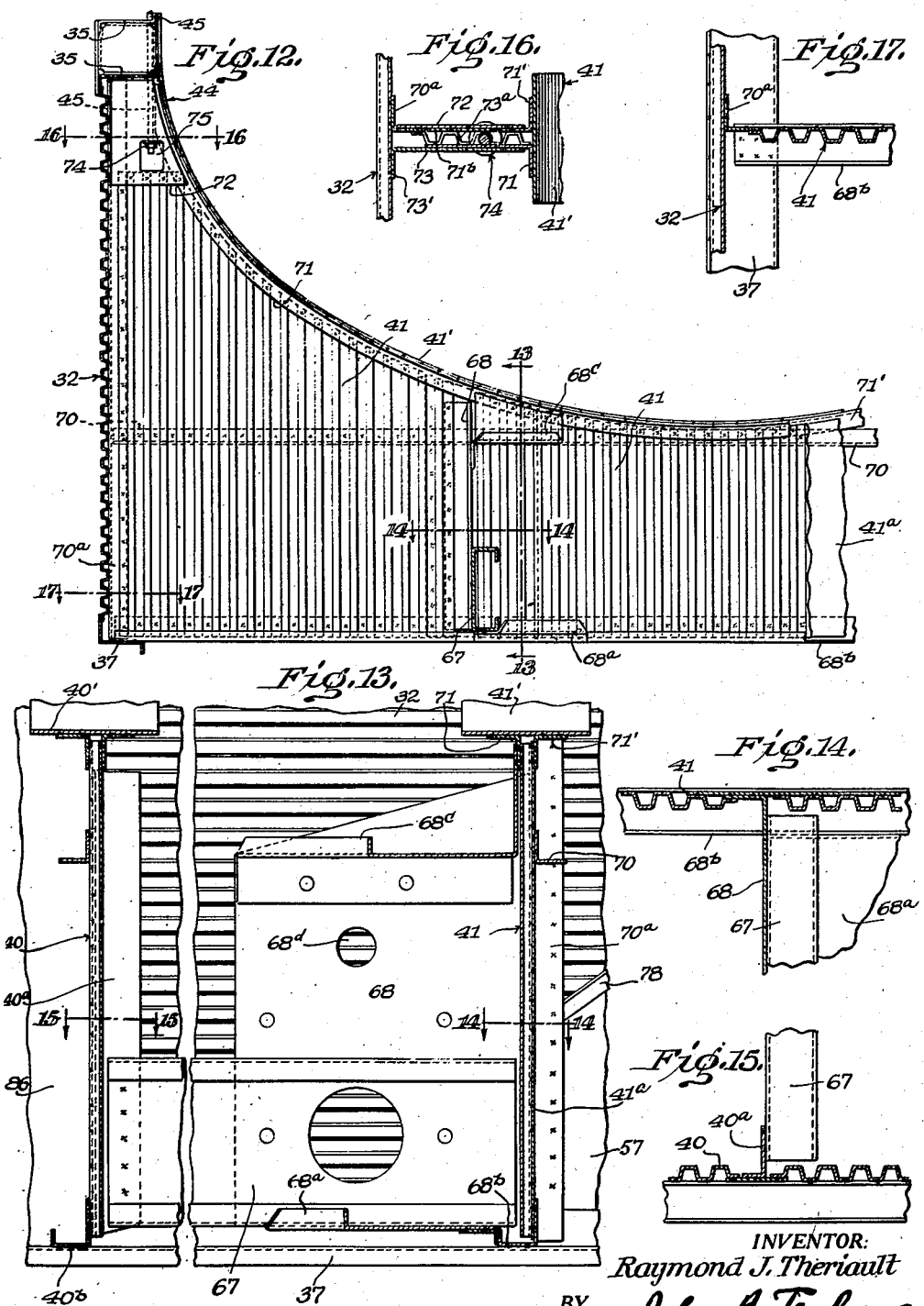

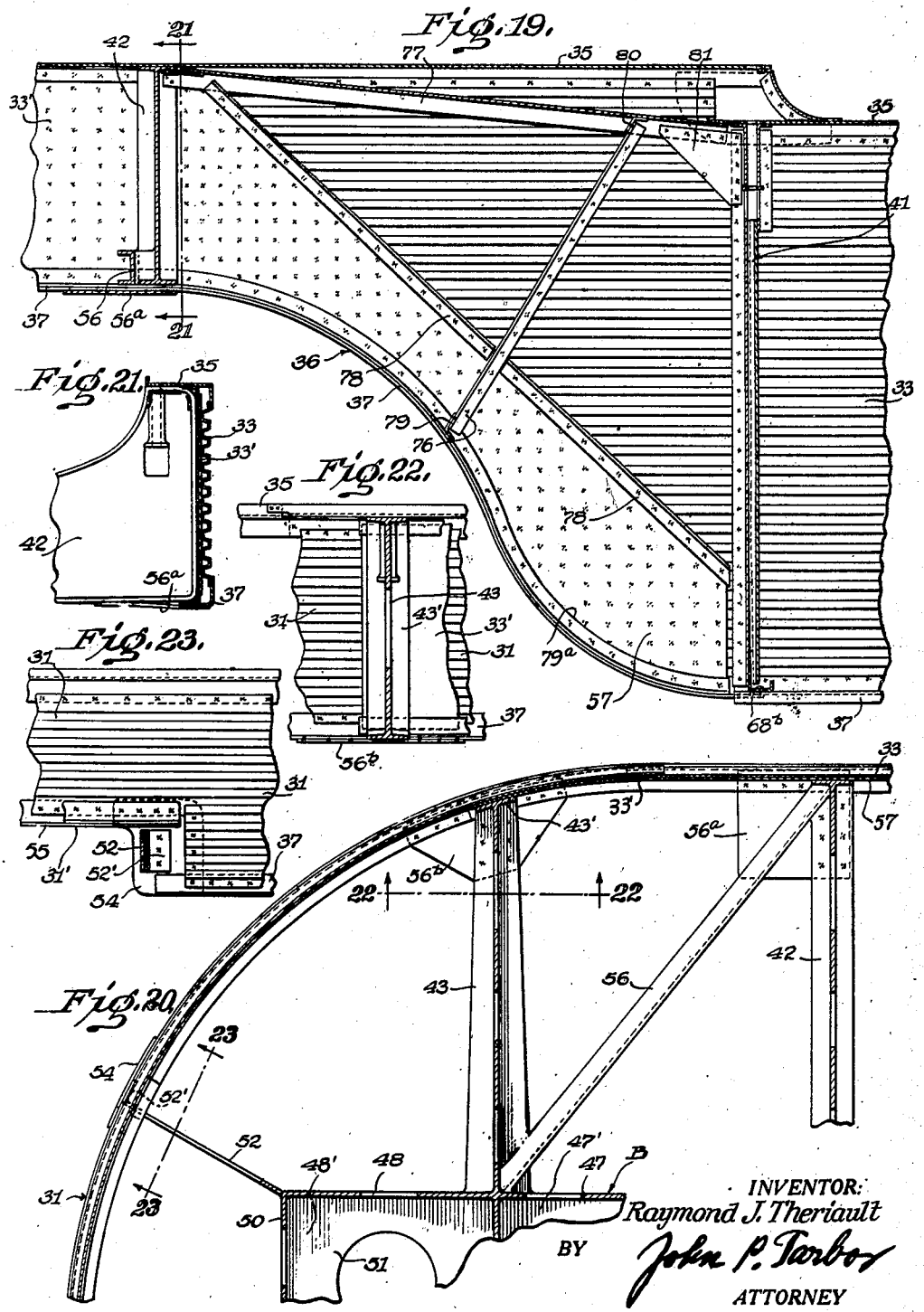

Patented Feb. 1, 1944

2,340,628

UNITED STATES PATENT OFFICE 2,340,628

TANK VEHICLE

Raymond J. Theriault, Philadelphia, Pa., assignor to Edward G. Budd Manufacturing Company, Philadelphia, Pa., a corporation of Pennsylvania Application June 26, 1940, Serial No. 342,406

15 Claims. (Cl. 280—5)

This invention in general relates to an improved design and construction for a tank vehicle, and more particularly to a trailer tank.

The object of the invention is to provide a tank vehicle such as a trailer tank structure embodying novel features of design and construction with a view to effecting a reduction in weight and material, and the attainment of marked economies in manufacture and upkeep.

Another object is to provide a tank supporting structure having side walls composed of sheet metal and adapted to support the load in combination with reinforcing bulkheads, whereby the customary complex and heavy tank chassis construction may be dispensed with, and a considerable gain made in simplification of structure and reduction of weight.

A further object is the provision of a tank structure of an exceptionally light weight but rigid construction, a pleasing, streamlined contour, and embodying efficiently disposed adjuncts to facilitate the convenient and safe automotive transportation of liquids over highways.

A still further object is to provide a tank vehicle structure having a frame composed substantially of sheet metal reinforced by cross members serving as the cradle or seat for the tank proper, whereby the structure may be reduced considerably in weight and the tank itself made of lighter material.

With the foregoing and other objects in view which will appear as the description proceeds, the invention resides in the combination and arrangement of parts, and in the details of construction, hereinafter described and claimed, it being understood that various changes in the precise embodiment of the invention herein disclosed may be made within the scope of what is claimed without departing from the spirit thereof.

The invention will be best understood by reference to the drawings wherein:

Figure 3 is a plan view of the structure, with the tank removed, and showing the general disposition of the bulkheads, and certain other component parts;

Figure 4 is a sectional view, taken on the line and as viewed in the direction of the arrows 4—4 of Figure 3;

Figure 5 is a fragmentary, enlarged, transverse sectional view, taken on the line and as viewed in the direction of the arrows 5—5 of Fig. 3;

Figure 6 is a fragmentary, enlarged sectional view, taken on the irregular line and as viewed in the direction of the arrows 6—6 of Fig. 3;

Figure 7 is a fragmentary, enlarged, transverse sectional view, taken on the line and as seen in the direction of the arrows 7—7 of Fig. 3;

Figure 8 is a fragmentary, enlarged, sectional detail view, taken on the line and as viewed in the direction of the arrows 8—8 of Fig. 7;

Figure 9 is a fragmentary, sectional view, taken on the line and as viewed in the direction of the arrows 9—9 of Fig. 8;

Figure 10 is a transverse sectional detail view, taken on the line and as viewed in the direction of the arrows 10—10 of Fig. 7;

Figure 11 is an enlarged, fragmentary, sectional detail view taken on the line and as seen in the direction of the arrows 11—11 of Fig. 4;

Figure 12 is an enlarged, fragmentary, transverse, sectional detail view, taken on the line and as seen in the direction of the arrows 12—12 of Fig. 3, and showing the general method of joining and welding the bulkheads to the side walls;

Figure 13 is an enlarged, fragmentary, sectional detail view, taken on the line and as seen in the direction of the arrows 13—13 of Fig. 12;

Figure 14 is a fragmentary, enlarged, sectional detail view, taken on the line and as seen in the direction of the arrows 14—14 of Figs. 12 and 13;

Figure 15 is a fragmentary, enlarged, sectional detail view, taken on the line and as seen in the direction of the arrows 15—15 of Fig. 13;

Figure 16 is a fragmentary, enlarged, sectional view, taken on the line and as seen in the direction of the arrows 16—16 of Fig. 12;

Figure 17 is a fragmentary, enlarged, sectional view, taken on the line and as seen in the direction of the arrows 17—17 of Fig. 12;

Figure 18 is a fragmentary, enlarged, longitudinal sectional view, taken on the line and as seen in the direction of the arrows 18—18 of Fig. 4;

Figure 19 is a fragmentary, enlarged, sectional detail view, taken on the line and as seen in the direction of the arrows 19—19 of Fig. 3;

Figure 20 is a fragmentary, enlarged, sectional detail view, taken on the line and as seen in the direction of the arrows 20—20 of Fig. 4;

Figure 21 is an enlarged, fragmentary, sectional detail view, taken on the line and as seen in the direction of the arrows 21—21 of Fig. 19;

Figure 22 is a fragmentary, enlarged, sectional detail view, taken on the line and as seen in the direction of the arrows 22—22 of Fig. 20; and Figure 23 is a fragmentary, enlarged, sectional detail view, taken on the line and as seen in the direction of the arrows 23—23 of Fig. 20.

Figure 1:
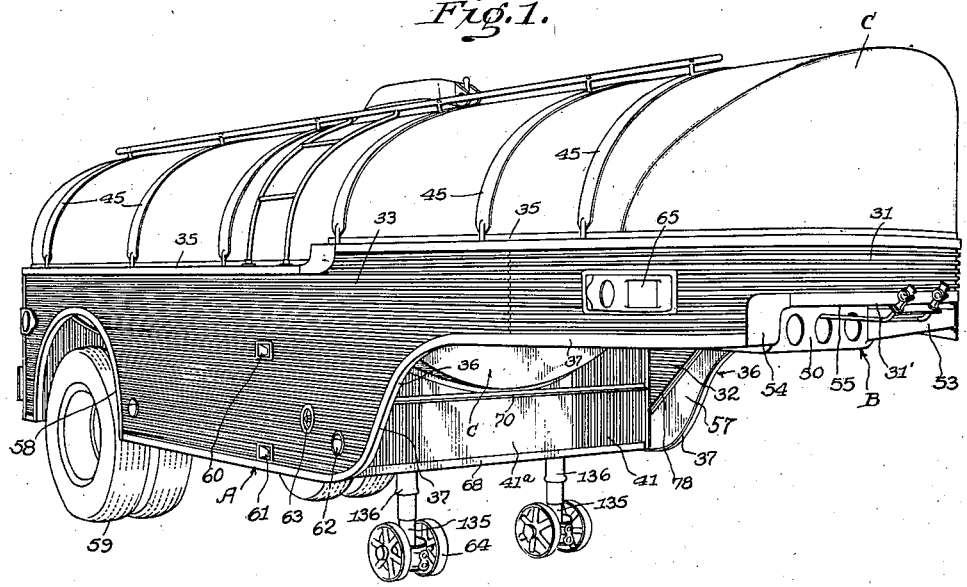
Figure 1 is a perspective front and side view of a trailer structure with the tank operatively installed and embodying a preferred form of the invention.

This invention, in its broader aspects, contemplates the provision of a vehicle or a trailer tank structure wherein the customary chassis or understructure construction is eliminated. In accordance therewith, the present vehicle or trailer consists substantially of a corrugated sheet metal frame stiffened and braced by a series of sheet metal cross members or bulkheads which are specially configured to provide a cradle on which the tank is directly seated and anchored. Each spring suspension system of this vehicle or trailer, including the wheels, is directly connected to means arranged on a pair of the same bulkheads. The landing gear and fifth wheel assembly of a trailer are in addition supported by these bulkheads.

By the above mode of construction, important operating advantages, as will become more apparent as the description proceeds, are achieved in the way of a substantial reduction in weight not only of the vehicle or trailer, but also of the tank supported thereon, since the latter is not called upon to serve as its own support and may accordingly be made of a lighter construction than customary.

In the drawings, similar characters of reference indicate corresponding parts in the several views wherein an automobile trailer tank structure embodying the invention is depicted; and as the welding process is principally employed in joining together the various elements and members of the said chassis, it is to be understood that throughout the description, unless otherwise specified or indicated, the terms "fastened," "joined" or "secured" individually connote the term "welded." In the accompanying views, this welding process is uniformly indicated by a cross or asterisk-like symbol. It is to be further undertsood that since the entire chassis is substantially symmetrical about is longitudinal axis, or more particularly on either side of the center line 4—4 of Fig. 3, a descrption of the details on one side of this center line will suffice for a clear comprehension of the details on the other side thereof.

Referring now in particular to the drawings the letter "A" designates the supporting structure or chassis as a whole. The numeral 31 designates a central or forward, arcuate frame or panel formed of a sheet of corrugated sheet metal such as stainless steel and die-stamped or roller drawn and bent to the desired contour. Side frame panels or webs 32, 33 similarly formed of corrugated stainless steel and arranged in opposed, spaced relation, have their forward edges welded to and merging with adjacent edges of the laterally stretching portions of the centre panel 31 to form a substantially unbroken, streamlined outer surface. A rear panel or frame 34 also formed substantially of corrugated stainless steel, is fastened to the adjacent ends of the side panels 32, 33. The upper edges of the centre and side panels, in conjunction with means hereinafter described, are provided with a tread or walk 35 for the convenience of the operator.

Figure 2:
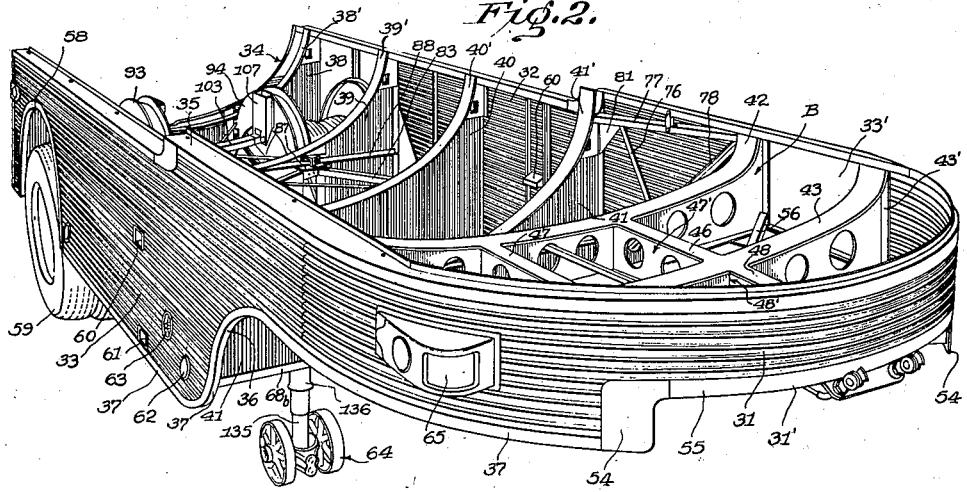
Figure 2 is a view similar to Figure 1 but from a higher viewpoint and showing the structure with the tank removed therefrom.

The lower forward edges of the side panels 32, 33 are cut away, as at 36, to accommodate the power unit or tractor (not shown) and merge smoothly with the sides of the centre panel 31, a suitable moulding or trim which may be composed largely of an angle section member, as at 37, being fastened thereto and forming a substantially continuous border on the entire depending joined edges of the said panels, as best shown in Figures 1 and 2.

The side panels 32, 33 are braced by a series of substantially similar transverse members, bulkheads or partitions 38, 39, 40 and 41 each comprising a web of a suitably braced sheet of corrugated stainless steel and arranged in spaced relation between the side panels 32, 33 (Figs. 3 and 4).

The centre panel or frame 31 and the forward ends of the side panels 32, 33 are in a somewhat similar fashion, braced by an assembly, designated generally at "B" and including, as hereinafter described more fully, a pair of spaced bulkheads or cross beams 42, 43 arranged between and having their flanged ends joined respectively to the laterally-extending, adjacent portions of the centre panel 31 and to the forward ends of the side panels 32, 33.

All of the bulkheads above-referred to, in addition to their function of bracing and reinforcing the centre and side panels and consequently the entire chassis, coact to provide a cradle or mount for the support of the tank "C".

Each of the side panel bulkheads above-mentioned, as, for example, the bulkhead 41 now to be described generally, is formed largely of corrugated sheet metal plate, preferably stainless steel, with rectangular side and bottom edges and an arcuate upper edge which curves upwardly from either side of a depressed central portion to the vicinity of the upper edges of the side panels (See Fig. 12). The upper lateral portions of the bulkhead 41, between its arcuate edge and its adjacent vertical edges, present oppositely-disposed, upwardly-stretching, narrow extensions, as at 44, to the upper portions of which the walks 35 are fastened. Arcuate sills 38′, 39′, 40′ and 41′ welded to the upper arcuate edges of the said bulkheads 38, 39, 40 and 41 respectively serve, in combination therewith, as cradles or mounts whereon the adjacent portions of the tank "C" are directly seated. Straps 45 extending across the upper part of the tank "C" and fastened to means secured to the bulkheads, anchor the said tank to the chassis, as described more fully in ensuing paragraphs.

The assembly "B" referred to above and now described more particularly, includes the cross I-beams or bulkheads 42, 43 each of which has its opposite ends fastened to the adjacent portions of the centre panel 31 and/or adjoining portions of the side panels 32, 33. These cross beams 42, 43 are joined to T-beams or members 46, 47 arranged transversely therebetween and are forwardly extended at 48, 49; the extended portions 48, 49 have their front ends joined by a cross bar 50. A bottom plate 51 (Figs. 3 and 4), fastened to the lower extremities of the bulkheads 42, 43 and to the members 46, 47, 48, 49 and the cross bar 50, serves to reinforce the said assembly and also as a support for the fifth wheel coupling assembly fastened thereto and designated generally at "D." As best shown in Figs. 3 and 4, the cross beams 42, 43, together with the associated members mentioned in this paragraph, form a pair of inner reinforcing boxes 47′, 48′. The finished assembly "B" presents one unitary structure as indicated in the drawings.

The means provided for bracing and reinforcing the center panel 31 and adjacent portions of the side panels 32, 33 are best shown in Figs. 3, 4 and 19 to 23 inclusive, and further include reinforcing plates or members 52, 53 which extend diagonally between and join the box 48' to the center panel 31, the latter at its forward portion being further cut away, as at 31'. The outer end of each of the last-mentioned plates which extend beneath and beyond the cut-away portion 31' of the center panel 31, is bent approximately at right angles, as at 52' and into welded contact with the inner surface of the said center panel where it is concealed beneath a local skirt or moulding 54. The skirts 54, which overlap and are welded to the mouldings 37 and to an interconnecting rail 55, are fastened to the center panel 31 and conform to its cut-away edge and forward reduced portion.

A brace bar 56 on each side of the assembly "B," diagonally stretches between and joins the spaced cross beams 42, 43. These brace bars 56 are also welded respectively to the side panels 32, 32 and to the adjacent portion of the boxes 47', 48'. A gusset plate 56ᵃ, fastened to the cross beam 42 and to the moulding 37 on the center panel, provides additional reinforcement at this point. Similar gusset plates 56ᵇ are welded to the cross beam 43 and adjacent side portions of the center panel 31. The last-mentioned reinforcement is best shown in Fig. 22 where one portion of the gusset 56ᵇ is shown as welded to the moulding 37 and the center panel 31, and another portion to the cross beam 43, at the ends of the latter, similarly to the cross beam 42, being provided with oppositely directed flanges, as at 43' at its junction with the adjacent panel.

The side panels 32, 33, from a line adjacent the bulkhead 41 to a line in advance of the bulkhead 43, are individually stiffened by an elongated arcuate plate 33' and plate 57, and have arcuate cut-out portions, as at 58 to accommodate the rear wheels 59. The panels 31, 32 are provided with inset pockets or steps 60, 61 which permit the operator to ascend to the walk or tread 35 and thence to the upper portion of the tank "C," and have openings to permit the attachment of suitable side light assemblies, as at 62, and of means, indicated generally at 63, for raising and/or lowering the landing gear 64 when desired. The center panel 31, in a similar fashion, is equipped on either side with a suitable lighting assembly, as at 65.

By inspection and comparison of Figs. 2, 3, 4, and 12 in particular, a general conception of the relative position of some of the more important units or assemblies of the chassis and the means employed for fastening them together in operative position, may be obtained. Other specific details for actually fastening the various members together will now be pointed out in connection with those views best adapted to illustrate the elements, as these follow in sequence in the description.

The bulkheads 40 and 41 are interbraced by two spaced, flanged channel members 66, 67 fastened therebetween, by being welded to correspondingly spaced rails 40ᵃ and plates 68, the latter being suitably apertured as at 68ᵈ for the reception of means connected to the landing gear 64. Each of the plates 68 has its lower edge fastened to a gusset plate 68ᵃ in turn secured to an angle bar 68ᵇ welded to a bottom portion of a stiffening plate 41ᵃ fastened to and across one face of the bulkhead 41.

The upper portion of each plate 68 is fastened to an adjacent gusset plate 68ᶜ which is secured to the bulkhead 41 (Figs. 12, 13). The stiffening plate 41ᵃ also has fastened thereto the bracing angle bar 70 which extends across its face and has its opposite ends welded to vertically arranged angle bars 70ᵃ in turn welded to the side panels 32, 33 and to adjacent ends of the horizontally-stretched angle bars or members 68ᵇ. Bulkhead 40 is likewise reinforced by a bottom rail 40ᵇ.

The upper arcuate edge of the typical bulkhead 41 has fastened thereto a pair of reinforcing arcuate angle members 71, 71', to the top of which the arcuate sill 41' mentioned above is in turn fastened, the adjacent portion of the tank "C" being seated on the latter. The extension 44, referred to above, which projects upwardly from the body portion of the bulkhead 41, and which is more or less characteristic of the extensions of the other bulkheads, comprises a pair of plates 72, 73 (Fig. 16) fastened in opposed relation on either side of the said extension 44. More specifically, it will be seen that the plate 72 is fastened to the upper portion of the vertically extending angle bar 70ᵃ and to the adjacent portion of the arcuate sill-reinforcing member 71', and is also fastened to a plate or member 71ᵇ welded to the corrugated body portion of the bulkhead 41. The other plate 73 has its flange 73' fastened to the panel 32 and its body portion welded to the sill-reinforcing member 71 and to a plate 73ᵃ in turn welded to the bulkhead 41. Both of the opposed plates 72, 73 have registering openings, as at 75, to permit access to the adjacent tank strap 45 which is protruded downwardly through a hole in the walk 35 and into the narrow space between the two plates 72, 73 where it is secured by a nut and washer, as at 74, as clearly shown in Figs. 12 and 16. A substantially similar set of means for the reception and retention of the threaded ends of the tank-securing straps 45 is provided in the other bulkheads.

Between the bulkheads 41 and 42, the side panels 32, 33, reduced in width in this vicinity, are reinforced by a plurality of interconnected, angularly-arranged, flanged bars or angle members 76, 77, 78 welded thereto (Fig. 19). The ends of the bar 76 have welded thereto angle members or brackets 79, 80, the lower bracket 79 being welded to the adjacent arcuate portion of an angle member 79ᵃ, to which latter the elongated, arcuate, panel-reinforcing plate 57 referred to above is fastened. The upper bracket 80 is secured to the flange of the angle bar 77, one end of the latter being joined to the under side of the walk 35, while its other end is welded to a gusset plate 81 which in turn is welded to the upper portion of the bulkhead 41. The third angle bar 78, which is composed of two sections arranged on either side of the bar 76, has one section fastened to the plate 57 and its other section fastened to the bar 77 and the same plate 57.

The bulkheads 39, 40 are interbraced by two pairs of diagonally-stretching, interconnected bars or members 82, 83 (see Figs. 2, 3 and 18). The adjacent mutually converging ends of the channel members 82, 83 are welded to a gusset plate 84 in turn welded to a flanged channel bar 85 fastened across a face of the bulkhead 40 and having each of its opposite ends joined to a flanged plate 86 joined to the upper edge of the body portion of the bulkhead 40 and to the adjacent side panel 33 (Fig. 18). The other end of each member 82 and the adjacent end of one bar 83 are welded to a gusset plate 87 fastened to a channel bar 88 welded across the face of the bulkhead 39, the said gusset plate also being welded to the body portion of the same bulkhead. Said pairs of members 82, 83 serve for distributing the stresses from longitudinal members 93, 94 which will now be described.

The panel and bulkhead-reinforcing and bracing means, described in the last paragraph, coact with a bracing and reinforcing assembly which includes a pair of diagonally-arranged tie-rods 89, 91 whose threaded ends are protruded through the bulkheads 38, 39 and through brackets 92 and 92'. The forward brackets 92 are welded to the gusset plates 87 and also to the channel bar 88. The said threaded ends are engaged and anchored by nuts abutted against the mentioned brackets. The reinforcing assembly further comprises, in addition to the tie rods 89, 91, a pair of arcuate brace members 93, 94 arranged over and in substantial parallelism to the spring assemblies designated generally at 95, and is joined to and between the bulkheads 38, 39. The detailed construction of this assembly and its mode of attachment to other coacting members associated therewith, is best shown in Figs. 3, 5 and 6.

Each of the arcuate brace members 93, 94 comprises a pair of similar, substantially arcuate, spaced plates 96, 96' which have their greatest width at their midsection, tapering thence to their opposite ends. The upper edges of the arcuate plates 96, 96' are joined in spaced relation by an arcuate channel member 97 having its side flanges welded to the inner sides of the adjacent edges of the said plates and its end flanges seated on gusset plates 98, 99 welded to the body portions of bulkheads 38, 39. The lower edges of the same plates 96, 96' are similarly joined in spaced relation by an arcuate channel member 100 having its flanges welded to the inner sides of the plates 96, 96'. As shown in Fig. 5, the arcuate member 94 presents in cross-section a box-like configuration providing a strong reinforcing means for the assembly. The above-referred to plates 96, 96' of the arcuate members 93, 94, from their central portion are projected outwardly and taper downwardly through openings in the opposed bulkheads 38, 39 having their flanged sides at this point welded to the said bulkheads where they are reinforced by vertically arranged, spaced angle bars 101, 102 (Fig. 5) joined to the body portions of the bulkheads 38 and 39.

The similar arcuate reinforcing members 93, 94, as best shown in Figs. 3, 4 and 6, are interbraced by an arcuate cross or channel member 103, to the opposite ends of which angle brackets 104, 105 are welded, the latter in turn being welded to a flanged plate 107, a third bracket 108 joining the central web of the channel member 103 and the said flanged plate 107. Each of the plates 107, as best shown in Fig. 6, has its flanges joined to the inner face of the adjacent arcuate member 93 or 94.

The two opposite and similar spring assemblies 95, referred to above, as best disclosed in Fig. 6, consist individually of two separate coacting nests of leaves, designated in Fig. 6 as 109$^a$ and 109$^b$, both nests being juxtaposed operatively together between plates or pads 112, 113 which are clamped by spring clips as at 114, the latter embracing the axle housing 115 wherein the rear wheel stub axles 115' are rotatably mounted by suitable means (not shown). By further inspection of Fig. 6, it will be seen that the upper spring nest 109$^a$ is operatively engaged by abutments 116, which may be of rubber. The abutments 116 are secured to bottom walls of inverted channel section members 116' connected to the bulkheads 38, 39 and the members 96, 96' and 100. The lower spring nest 109$^a$ has its opposite extremities pivotally engaged by bolts or means 117, 118 fastened to and protruded through the arcuate members 93, 94 where they are suitably reinforced as by brackets 121 welded to the adjacent outer side of the said arcuate members. The spring shackle bolts 117, 118 are lubricated from the inner side of the arcuate members 93, 94 by suitable means (not shown).

As further disclosed in Figs. 6 and 7, U-sectional or channel members 123, 124 are welded to the inner faces of the plates 96, 96' of each arcuate member 92, 93 and are adapted to support a bumper assembly best shown in Figs. 8 and 9. In the illustrated embodiment, the members 123 and 124 are integral with the rear members 116' described hereinbefore. The bumper assembly includes the customary outer bar or bumper 125 to which is fastened a pair of inwardly projected beams 123, 124 mentioned above. Each beam is reinforced by gusset plates 126 joining it and the adjacent portion of the bumper bar. The beams 123, 124, which may be channel members, have their sides welded to angle members 127 forming a part of the rear panel or frame 34, and at their junction with the bulkhead 38 are reinforced by gusset plates 128, the gusset plates 128 serving also for the attachment of the rear ends of the rods 89, 91 by means of said brackets 92'.

Additional details of the present invention include the assembly for operating the landing gear 64, which is supported by means secured to the bulkhead 41. This assembly comprises a manually operable shaft 131 rotatably protruded through the side panel 33 and extending through a pair of similar casings 132, 133 fastened to the channel members 66, 67 and to gusset plates 68 joined thereto and to the bulkhead 41. The mechanism for raising and lowering the landing gear, which in itself forms no part of the present invention, includes a shaft 135 rotatably mounted within a sleeve 136 having means adapting it to be raised and lowered through the intermediary of the manually operable shaft 131. The shaft 135 carries the wheels of the landing gear.

The side members 32 and 33 respectively are reinforced between successive bulkheads by vertical reinforcing bars 137, 138, 139, 140. The side members 32 and 34 respectively are furthermore reinforced between the bulkheads 38 and 39 and in front of the latter by inner reinforcing plates 141 and 142 which are welded to the corrugated outer plates and have similar functions as the previously described reinforcing plates 33' and 57 in the front region. The side members 32, 33, together with their reinforcements present shallow girders with a high web, or in other words, girders of comparatively great width which are arranged on edge. Also other portions may be reinforced wherever necessary by superimposed rails, plates, or the like, and, indeed, such reinforcements are shown at the different places in the drawings without it being deemed necessary to specifically describe all those details the nature of which is obvious from the description of corresponding or similar parts shown at other places of the drawings.

It is to be understood that the invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention; and it will be further understood that each and every novel feature and combination present in or possessed by the mechanism herewith disclosed, forms a part of the invention included in this application.

What is claimed is:

1. In a tank vehicle, a tank supporting frame structure, said structure comprising side members and transverse members, said members being in the form of shallow girders with a high web of sheet material, said side members being arranged in about the region of the lateral side margins of the vehicle and extending at least between points adapted for the attachment of front and rear wheel suspensions so as to constitute the main load transmitting members, said transverse members being at their ends of a height of about the same order as the height of said side members, the upper margin of said transverse members being downwardly curved toward the longitudinal center line of the vehicle as to support the lower portion of a tank between said side members, and the lower margin of said transverse members being arranged at about the level of the lower margins of said side members.

2. In a tank vehicle, a tank supporting frame structure adapted to have directly attached thereto front and rear wheel suspensions and to be supported by such suspensions, said structure comprising side members and transverse members, said members being in the form of shallow girders with a high web, said side members being arranged near the lateral side margins of the vehicle, said web consisting mainly of corrugated sheet material, said transverse members being at their ends of a height of about the same order as the height of said side members, said ends of the transverse members being arranged at about the same level as the side members and being rigidly connected to the latter, the upper margin of said transverse members being downwardly curved toward the longitudinal center line of the vehicle as to support the lower portion of a tank between said side members.

3. In a tank vehicle, a tank supporting chassis frame structure, said structure comprising side members and transverse members, said members being in the form of shallow girders with a high web, said side members being arranged in about the region of the lateral side margins a tank to be supported by the structure, said web consisting mainly of sheet material corrugated in the longitudinal direction of the vehicle, said transverse members having wide ends connected to said side members, the upper margin of said transverse members being downwardly curved toward the longitudinal center line of the vehicle as to support the lower portion of a tank between said side members.

4. In a vehicle, a tank supporting frame structure, said structure comprising side members and transverse members, said members being in the form of shallow girders with a high web, said side members being arranged in about the region of the lateral side margins of the vehicle and extending from about the horizontal middle plane of to a horizontal plane below a tank to be supported by said structure, said transverse members having widened ends which are connected to said side members, the upper margin of said transverse members being downwardly curved toward the longitudinal center line of the vehicle as to form a support between said side members for the lower portion of a tank correspondingly curved in cross section.

5. In a tank vehicle, a tank supporting frame structure, said structure comprising side members and transverse members, said members being in the form of shallow girders with a high web, said side members being arranged in about the region of the lateral side margins of the vehicle and having a web of horizontally corrugated sheet material, the upper margin of said transverse members being arranged so as to provide space for the lower portion of a tank between said side members, transverse end wall members being connected to the ends of said side members and being likewise horizontally corrugated.

6. In a tank vehicle, a tank supporting frame structure, said structure comprising side members and transverse members, said members being in the form of shallow girders with a high web, said web consisting mainly of sheet material, said transverse members having wide ends which are attached to said side members, the upper margin of said transverse members being downwardly curved toward the longitudinal center line of the vehicle as to support the lower portion of a tank between said side members, the webs of said transverse members being vertically corrugated.

7. In a tank vehicle, a tank supporting frame structure, said structure comprising side members and transverse members, said members being in the form of thin but high structures arranged on edge, said side members being arranged in about the region of the lateral side margins of the vehicle, at least some of said members having a web of corrugated sheet material, such web being reinforced by means extending across and being fastened to the corrugations, said transverse members being at their ends of a height of about the same order as the height of said side members, the upper margin of said transverse members being downwardly curved toward the longitudinal center line of the vehicle as to support the lower portion of a tank between said members.

8. In a tank vehicle, a tank supporting frame structure, said structure comprising side members and transverse members, said members being in the form of shallow girders with a high web, said side members being arranged in about the region of the lateral side margins of the vehicle, said web comprising as main element horizontally corrugated sheet material, said transverse members being at their ends of a height of about the same order as the height of said side members, the upper margin of said transverse members being downwardly curved toward the longitudinal center line of the vehicle as to support the lower portion of a tank between said side members, said side members being reinforced by rails which extend across and are fastened to the corrugations of said webs.

9. In a tank vehicle, a tank supporting frame structure, said structure comprising side members and transverse members, said members being in the form of shallow girders with a high web, said side members being arranged in about the region of the lateral side margins of the vehicle, said web comprising as main element horizontally corrugated sheet material, said transverse members being at their ends of a height of about the same order as the height of said side members, the upper margin of said transverse members being downwardly curved toward the longitudinal center line of the vehicle as to support the lower portion of a tank between said side members, said side members being reinforced by rails which extend across and are fastened to the corrugations of said webs and to which rails are fastened the ends of said transverse members.

10. In a tank vehicle, a tank supporting frame structure, said structure comprising side members and transverse members, said members being in the form of shallow girders with a high web of sheet material, said side members being arranged in about the region of the lateral side margins of the vehicle, said transverse members being at their ends of a height of about the same order as the height of said side members, the upper margin of said transverse members being downwardly curved toward the longitudinal center line of the vehicle as to support the lower portion of a tank between said side members, a pair of longitudinal members between two transverse members, said longitudinal members being spaced from said side members and from each other in the transverse directions of the vehicle and are adapted for the attachment of a part of the supporting means of the vehicle such as road wheels, landing gear or fifth wheel structure.

11. In a vehicle, a supporting frame structure, said structure comprising longitudinal side members and transverse members, said members being in the form of shallow girders with a high web, said transverse members having their ends secured to said side members, a pair of auxiliary longitudinal members between two transverse members, said auxiliary longitudinal members being spaced from said side members and from each other in the transverse directions of the vehicle and adapted for the attachment of spring suspension means for a pair of road wheels, a plurality of members being fastened to and extending from at least one of the ends of said auxiliary longitudinal members in different directions inclined in plan view with respect to the side and transverse members and being fastened to said side and transverse members at points spaced from said ends of said longitudinal members so as to distribute the stresses from said auxiliary longitudinal members into the adjacent portions of said frame structure.

12. In a vehicle, a supporting frame structure, said structure comprising longitudinal side members and transverse members, said transverse members having their ends connected to said side members, a pair of auxiliary longitudinal members being arranged between and secured to two transverse members, said auxiliary longitudinal members being spaced from said side members and from each other in the transverse directions of the vehicle and being adapted for the attachment of spring suspension means for a pair of road wheels, supporting means for a bumper at the one end of the vehicle being tied into one end of each of said auxiliary longitudinal members.

13. In a vehicle, a supporting frame structure, said structure comprising a pair of longitudinal side members interconnected by transverse members, said members being in the form of shallow girders with a high web, said transverse members being at their ends of a height of about the same order as the height of said side members, a second pair of longitudinal members being arranged between and secured to at least two of said transverse members, said longitudinal members of the second pair being spaced from said side members of the first pair and from each other in the transverse directions of the vehicle and being adapted for the attachment of spring suspension means for a pair of road wheels, said longitudinal members of the second pair being of box section and having at least the under side upwardly curved in the middle region of their length.

14. In a tank vehicle, a tank supporting frame structure, said structure comprising side members and transverse members, said members being in the form of thin but high structures arranged on edge, said side members being arranged in about the region of the lateral side margins of the vehicle, said transverse members being at their ends of a height of about the same order as the height of said side members, the members of both types being arranged at about the same level and connected to one another, the upper margin of said transverse members being downwardly curved toward the longitudinal center line of the vehicle as to support the lower portion of a tank between said side members, said longitudinal members having a web of sheet material and upper and lower chord members, said upper chord member being formed as a cat walk.

15. In a tank vehicle, a tank supporting structure comprising longitudinal girder structures of comparatively great width and being arranged on edge, transverse bulkheads interconnecting said girder structures and being adapted to support a tank, said longitudinal girder structures comprising a web of corrugated sheet material and having a portion of greatly diminished depth at the location of supporting wheels, said web being reinforced in the region of diminished depth by a flat plate of sheet material which is fastened to the corrugations and which extends beyond said region so as to distribute the stresses into the adjacent portion of the web of full height.

RAYMOND J. THERIAULT.